UNITED STATES PATENT OFFICE.

ALPHONSE L. POITEVIN, OF PARIS, FRANCE, ASSIGNOR TO LEOPOLD EIDLITZ, OF NEW YORK CITY.

APPLICATION OF PHOTOGRAPHY TO PRINTING.

Specification forming part of Letters Patent No. 36,821, dated October 28, 1862.

*To all whom it may concern:*

Be it known that I, ALPHONSE LOUIS POITEVIN, of Paris, France, have invented certain new and useful Improvements in the Application of Photography to the Production of Printing and other Irregular Surfaces; and I do hereby declare that the following is a full, clear, and exact description of the same.

I pour or float upon a smooth plane surface—as, for example, a sheet of glass—a uniform film or layer of a solution of gelatine. The thickness of this layer when dry should be proportionate to the height of the reliefs and the depth of the hollows which it is intended to produce. After drying it I plunge it into a concentrated solution of bichromate of potash or other salt of the same acid, provided that the base of the salt does not produce with gelatine a substance insoluble in water. After an immersion of some minutes I remove it and wash it slightly in water and again dry it. In lieu of drying the gelatine before immersing it in the chromate, it may be immersed as soon as it has set and acquired sufficient firmness. In some cases I mix the solution of gelatine and the bichromate before pouring it upon the glass or other surface. The layer of chromatized gelatine is exposed to the action of light in the camera obscura, or in contact with a positive or negative photographic picture, or with an engraving or other object which it is intended to reproduce. After a sufficient exposure I plunge it into water. The parts which have not been acted upon by the light absorb the water and swell or expand, while the parts which have been acted upon by the light only become slightly moistened, and thus form hollows. Thus the reliefs correspond to the darks and the hollows to the lights. A reverse mold or cast is taken in plaster-of-paris or other plastic material, or by means of the electrotype process, after first rendering the surface a conductor of electricity. On taking a plaster mold after swelling the gelatine, as hereinbefore mentioned, I pour upon it a solution of protosulphate of iron, and I afterward wash it to remove the excess of protosulphate. It is then surrounded with a frame of bars and the plaster is poured upon it. When the plaster has set it is carefully removed. A great many good molds may thus be obtained, taking care to clean the gelatine after each operation, and to treat it with the solution of protosulphate of iron, and to wash it in plenty of water. The protosulphate of iron gives consistence and strength to the plaster, some of the finer portions of which might otherwise be broken or injured in separating the mold from the gelatine.

In producing a mold by the electrotype process I metallize the surface of gelatine by impregnating it after swelling it with water and drying it with a solution of iodide of potassium or other iodide, or by immersing it at once after the exposure to light in an aqueous solution containing one-twentieth part, by weight, of iodide of potassium, and then after draining off the excess of iodide I plunge the gelatine into a solution containing one-tenth part of nitrate of silver. The whole surface of the gelatine is then exposed to light and the iodide or other compound of silver upon or within its surface is modified or acted upon by the light, and is afterward reduced by a solution of protosulphate of iron. The surface is thus covered with a film of metallic silver, which is a conductor of electricity, and fit for receiving the electro deposit. The proportions of the materials admit of variation. From the plaster-molds I obtain metallic plates by the ordinary stereotype processes or by the electrotype process.

The plates or casts may be multiplied and reversed by the ordinary process. Thus a direct or positive photograph or other picture produces an engraving on gelatine the reliefs of which correspond to the darks of the picture, and a mold in plaster or a plate in copper is obtained from the gelatine with the hollows corresponding to the darks, as required for printing in the manner of ordinary copper-plate engraving. A reverse or negative picture produces an engraving on gelatine in which the reliefs correspond to the darks of the negative, and consequently to the lights of the positive; and this gelatine yields a reverse mold in plaster or in copper in which the darks are in relief, as required for printing in the manner of typography or wood-engravings. When the mold is taken in plaster a second reverse plaster mold may be taken from it and used to produce a stereotype or electrotype plate. I find that the chromatized gelatine is acted upon in the requisite manner by the light, as hereinbefore described, without the addition to it of nitrate of silver or other salt of silver.

The engraved plates or surfaces thus produced are adapted for printing upon paper, cloths, and other fabrics or materials, and also for embossing or stamping card or paper or other suitable material, and also as molds for earthenware, porcelain, or other plastic substances, and for other purposes for which engraved plates or surfaces are required. They may be employed in a flat or curved or cylindrical form as may be required.

I claim—

1. The application in the process of photographic engraving hereinbefore described of a plate of glass or other suitable surface coated with a solution of gelatine, which is allowed to set or solidify, and is then (either before or after being dried) immersed in or exposed to the action of a solution of bichromate of potash or other chromate whose base does not produce an insoluble compound with gelatine.

2. The application in the process of photographic engraving, in manner hereinbefore described, of a plate or surface coated with a mixture of gelatine and bichromate of potash or other suitable chromate, or first coated with gelatine and then exposed to the action of the bichromate of potash or other suitable chromate, in either case without the addition of nitrate of silver.

3. The application of a solution of protosulphate of iron to the surface of the photographic gelatine engraving before pouring the plaster upon it in the process of taking a plaster cast from the gelatine, as hereinbefore described.

4. The mode hereinbefore described of metallizing the surface of the gelatine before submitting it to the electrotype process.

ALPHONSE LOUIS POITEVIN.

Witnesses:
  GEO. HUTTON,
  JAMES W. BROOKS.